UNITED STATES PATENT OFFICE 2,298,270

MANUFACTURE OF MODIFIED ORGANIC ISOCOLLOIDS

László Auer, Bloomfield, N. J.

No Drawing. Application February 12, 1940, Serial No. 318,650. In Hungary May 19, 1926

15 Claims. (Cl. 260—407)

This invention relates to the manufacture of modified organic isocolloids and it comprises processes of modifying the properties of organic isocolloids such as oils, resins, waxes, tars, pitches, etc., with the aid of minor amounts of polar compounds, and it also comprises the modified products so obtained, as more fully hereinafter set forth and as claimed.

This application is a continuation in part of my prior copending application Serial No. 143,786, filed October 23, 1926, now Patent 2,189,772. It is also a continuation in part of the several divisions and continuations of that application previously filed by me, particularly my copending application Ser. No. 359,425, now Patent 2,213,944, filed April 30, 1929, as a continuation in part of said Ser. No. 143,786. The several divisions and continuations of my Ser. No. 143,786, previously filed by me, are as follows:

Ser. No. 273,159, filed April 26, 1928, now Patent 1,985,230; Ser. No. 273,160, filed April 26, 1928, now Patent 1,985,231; Ser. No. 359,424, filed April 30, 1929, now Patent 2,007,958; Ser. No. 359,425, filed April 30, 1929, now Patent 2,213,944; Ser. No. 359,426, filed April 30, 1929, now Patent 1,980,366; Ser. No. 359,427, filed April 30, 1929, now Patent 1,957,437; Ser. No. 446,170, filed April 21, 1930, now Patent 2,234,949; Ser. No. 446,171, filed April 21, 1930, now Patent 1,980,367; Ser. No. 446,172, filed April 21, 1930, now Patent 2,213,943; Ser. No. 446,174, filed April 21, 1930, now Patent 2,180,342; Ser. No. 466,587, filed July 8, 1930, now Patent 2,106,708; Ser. No. 188,014, filed January 31, 1938, now Patent 2,224,666; Ser. No. 236,800, filed October 24, 1938; and Ser. No. 305,409, filed November 20, 1939, now Patent 2,234,545.

In my prior applications, aforesaid, I have also described processes for modifying the properties of organic isocolloids.

As disclosed in those applications, I have found that by dispersing or dissolving various modifying agents in oils and other organic isocolloid materials, I obtain new modified organic isocolloid products having altered properties which are useful in the commercial and industrial arts as shown therein. The modifying agents are employed in minor amounts and are organic and inorganic compounds which are electrolytes or polar compounds capable of influencing the modification of the isocolloid substances. In those applications many illustrative examples of the practice of my generic invention or discovery are disclosed.

This application is a continuation in part of all of my prior applications ante and the various organic isocolloid materials and polar compounds or modifying agents and the several procedures disclosed in such applications are useful in the practice of the present invention.

My invention, as stated in said Ser. No. 143,786, broadly relates to the treatment of natural and artificial isocolloid substances containing a mixture of carbon compounds (organic isocolloids) by processes involving colloidal transformations to modify their properties and improve their usefulness in the several arts wherein such organic isocolloids are ordinarily employed for various purposes.

By "isocolloid substances" I mean colloidal substances whereof the dispersed phase and the dispersion medium of the colloidal system are both of the same chemical composition but, of course, in a different physical state. That is, organic isocolloids are mixtures of chemically similar organic compounds wherein one or more of those compounds are dispersed or dissolved in the others which serve as the dispersion medium of this isocolloid system. Such isocolloidal systems (or organic isocolloids) are able to enrich the dispersed phase, while the amount of the dispersion medium will be accordingly reduced. For instance, linseed oil and like fatty oils are typical naturally occurring substances of this type. In fact, I made my basic discoveries relating to organic isocolloid and the modification thereof from my studies of such fatty oils.

In studying the drying of fatty oils such as linseed oil, as stated in my Ser. No. 143,786, I found that colloidal transformations play an important part in the physical changes incident to the drying of such oils. By "colloidal transformation" I mean those changes which occur in the colloid system of the body involving an alteration in the number and size of the colloid aggregations (micelles), which result in a modification of the physical properties of the body, such as viscosity, melting point, elasticity, film-strength, etc. By continuing my studies, I further discovered that colloidal transformations are also of great importance in modifying other organic isocolloids such as mineral oils, resins, waxes, tars, pitches, etc., as well as in the case of fatty oils.

That is, I have found that not only the fatty oils but natural and industrial (artificial) organic isocolloid materials containing carbon compounds and of isocolloid nature, in general are susceptible to those colloidal chemical reactions involving colloidal transformations. Such substances are fatty oils, mineral oils, natural resins, waxes, tar and tar oils, asphalt and asphalt oils, goudron or petroleum distillation residues, pitches, high boiling point mineral oil fractions containing naphthenic acids, artificial (synthetic) resins particularly those containing natural resins or acids of fatty oils and of resins, rubber and rubber-like hydrocarbons (synthetic rubbers), fatty acids, which are typical general examples of natural and artificial organic isocolloids. Also chemical isocolloid bodies, such as styrene, etc. may be used.

And I have succeeded by colloidal chemical processes in increasing or in reducing the viscosity of such materials by my invention. Likewise by my invention, I have also modified their other properties as shown in my prior applications.

As shown in my Ser. No. 143,786 (and other prior applications), I have found that thick oil-like products and even solid substances can be obtained from thin oils. Again, other oils having reduced viscosity can also be obtained in some embodiments of my invention.

I have further found that resins, either soft or liquid or of any intermediate stage of viscosity or hardness may be obtained from solid resins. In the case of resin-like products, which as is known are solids at ordinary temperatures, the increase of viscosity, that is to say the process of solidification, is indicated by the increase in the point of fusion of the products treated, whereas in the case of liquefaction, a considerable reduction or lowering of the point of fusion is noticeable.

Thus by my investigations, I have found that the viscosity and other properties of organic isocolloid substances containing carbon compounds and which are either liquid or fusible or thermoplastic, may be substantially modified by altering the structure of such isocolloid, the said alterations being effected by interaction between the isocolloid substance and a minor amount of an electrolyte or polar compound.

In the broad practice of my invention, the electrolyte or polar compound may be incorporated in the organic isocolloid in any suitable manner. Various methods for doing this are disclosed in my prior applications set forth ante.

As stated in my Ser. No. 143,786, the electrolyte (modifying agent) and the raw or starting material (organic isocolloid) may be mixed cold or melted together or boiled, in the absence of or in the presence of various additional materials, as described and illustrated in that application and my other prior applications.

As stated ante, the modifying agents employed in my processes are inorganic or organic compounds which are electrolytes or polar compounds and which are capable of influencing the modification of the organic isocolloid material, such as the fatty oils, etc., given ante. Many examples of such electrolytes or polar compounds are given in my prior applications. The following classes of polar compounds are typical of the various modifying agents disclosed in those applications:

Metal salts of inorganic acids
Metal salts of organic acids
Inorganic acids
Organic acids
Metallo-organic compounds
    Metal alcoholates (M—O—R)
    Aryl-metal compounds (R—M)
Organic salts of inorganic acids
Inorganic salts of organic bases
Organic esters Several illustrative examples of such electrolytes or polar compounds, namely, salts and acids, are given in my prior application Ser. No. 143,786. Further examples of polar compounds comprising within the molecule, an acidic inorganic residue and an organic residue are given in my application Ser. No. 359,425 wherein it is pointed out that such organic polar compounds as a general class are advantageous in my processes as the modifying agent.

The above classes of polar compounds are fully illustrated by the typical and specific examples given in my prior applications ante and are useful in the practice of the present invention. That is, I employ similar polar compounds and procedures in the present invention.

For instance, in the practice of my invention, I may employ as the electrolyte or polar compound, salts and acids, either separately or mixed. I find the salts of inorganic and organic acids, particularly the acid salts of polybasic acids, are advantageous. Illustrative examples of these are given post. Also, I may employ the acids, themselves, either inorganic or organic acids, as illustrated post. In general, acidic polar compounds are advantageous in modifying fatty oils. For one thing, the modified fatty oil products obtained with the aid of such polar compounds, dry faster. That is, they have an increased drying velocity as compared with the original oil. This is advantageous in modifying non-drying and semi-drying fatty oils, as well as in treating drying oils. Further, in addition to increasing the drying velocity, the acidic polar compounds also increase the rate of bodying of fatty oils in most cases. That is, fatty oils bodied in the presence of acidic polar compounds have a greater body than that of the same oil bodied, alone, under the same conditions. These and other advantages of acidic polar compounds are illustrated post. Further, I may employ mixtures of these electrolytes (salts, acids, etc.) as shown in my prior applications.

In other words, as stated in my Ser. No. 143,786, as the electrolyte in my processes, various metal salts can be used, as well as acids and organic metal compounds, separately or mixed, as desired.

As also stated in my Ser. No. 143,786 and other prior applications, the modifying agent should be added to the starting material in a dry form (without the presence of water) and in relatively small amounts, namely a minor amount of the polar compound based on the organic isocolloid. Generally, a few percent is sufficient, as stated in my Ser. No. 143,786.

In most cases, the amount of modifying agent or polar compound used, according to my invention, is normally from 2 to 10 percent by weight on the starting material, as stated in Ser. No. 359,425. However, larger or smaller amounts may be used and in the general practice of this invention, the amount of polar compound may range from 0.01 to 30%. Generally, I have found that the degree of modification of the final products increases as more modifying agent is employed. It is not necessary to use more than 30%, nor in the case of salts is it usually possible to dissolve more than this proportion. With organic modifying agents, it is of course possible to employ large proportions if desired. However, in some cases, as little as a fraction of a percent of the polar compound, say 0.01 to 0.9 percent gives good results. In most cases, the amount used ranges from 1 to 20% and this is a good working range. Of course, the amount used in a given case, depends on the polar compound employed and the results desired. Also much depends on the particular organic isocolloid being modified and the conditions used to obtain the modification sought. In modifying fatty oils with acidic polar compounds or electrolytes, the amount of such modifying agents based on the weight of the fatty oil may advantageously range from 0.01 to 5 percent. The examples given post illustrate how the proportion of the polar compound or modifying agent may be varied as desired.

In my processes, the first step is to mix these minor amounts of the electrolyte or polar compound with the organic isocolloid to be modified and produce an intimate admixed of the two materials. The solid polar compounds may be added in the form of a dry powder. In such cases, it is advantageous to mill the dry modifying agent with the starting material (organic isocolloid) using any of the mills, rolls, etc., for producing a colloidal dispersion. If the organic isocolloid is also a solid, the two materials may be ground together until a uniform mixture is obtained. Again, if the organic isocolloid is a liquid, such as an oil, the mills or rolls used for grinding inks, paints and the like, may be employed. In this way, the solid polar compound may be ground into and dispersed in the oils, etc., to be modified. Other methods of dispersing or dissolving the polar compounds in the organic isocolloids may also be used. For instance, both the polar compound and the organic isocolloid may be dissolved in a suitable solvent. Again, the liquid polar compounds may be directly mixed with the oils by stirring. The mixtures produced in any of these ways, can be subjected to further treatment such as heating, if desired, as pointed out in my prior applications.

As to the temperatures employed, they may be varied over a wide range, the mixture being maintained at a suitable temperature until the desired modification is obtained. As stated in my Ser. No. 143,786, in certain cases the modification takes place at low temperatures, for instance, at room temperature. But as there stated, the best results are obtained at temperatures considerably above room temperature but below the boiling point of the isocolloid. Generally, I find that temperatures between 100° and 350° C. give a desirable modification of most organic isocolloids by my processes. In modifying fatty oils, temperatures between 200° and 350° C. may be used and temperatures between 260° and 310° C. are advantageous in my methods. At such temperatures, continued heating for several hours produces a simultaneous heat-bodying or polymerization of the oil.

Further, as stated in my Ser. No. 143,786, the heating of the oil or other organic isocolloid in the presence of the polar compound or electrolyte (modifying agent) may be done in open vessels and at atmospheric pressure. However, as also stated there, advantageous results are obtained when the heating is carried out in closed vessels, such as kettles, autoclaves, pipe coils, etc., to secure the desired modification with the aid of the polar compound. In such cases, the heating may be carried out under reduced or increased pressure with advantage. For instance, heating the mixture under reduced pressure or vacuum, advantageously influences the modification as shown post. Likewise, heating under pressure also is advantageous and influences the modification. It is advantageous when volatile solvents or polar compounds or both are used and the mixture heated above the normal boiling point of such materials. Heating under pressure is also advantageous with certain oils, such as tung oil and the like. For one thing, the pressure assists in preventing the coagulation or gelling of tung oil which ordinarily occurs when tung oil is heated to 500–540° F.

Thus, in the broad practice of my invention, the polar compound or electrolyte is incorporated in the organic isocolloid in any suitable manner.

For instance, the organic isocolloid and the polar compound may be mixed cold; that is, at room temperature, when the polar compound is directly soluble in the organic isocolloid. In such cases, a modified product is directly obtained.

Again, the polar compound and the organic isocolloid may be simply melted together or fused into a homogeneous mass, if both are readily fusible and miscible with each other. Here too, a modified product is directly obtained.

Further, the organic isocolloid and the polar compound can be boiled together, that is, heated to relatively high temperatures, such as 300° to 350° C. as shown in my Ser. No. 143,786. This is advantageous when the polar compound (electrolyte) is difficultly soluble in the particular organic isocolloid being modified. However, in most cases, somewhat lower temperatures, say 200° to 300° C. are used, as stated ante, particularly in modifying fatty oils. Likewise, in some cases, it is desirable and advantageous to continue the heat treatment for one or more hours. In this way marked modification of fatty oils and other organic isocolloids may be obtained.

Incorporation of the electrolyte or polar compound in the organic isocolloid by any of these methods produces substantial modification of its properties. That is, my processes may be practiced in the absence of any additional material, other than the electrolyte or polar compound. However, I have found it is advantageous in some cases to incorporate the electrolyte in the presence of additional materials which facilitate its incorporation and the modification of the organic isocolloid. For instance, the electrolyte may be incorporated in the presence of various organic bodies such as the purely organic additions mentioned post or organic solvents. Again metal soaps may be also added; for instance siccatives such as the resinates and linoleates of metal compounds and metal oxides, commonly used in the varnish industry, as shown in Ser. No. 143,786. Further, sulfur or sulfur compounds, such as sulfur chloride, etc., may also be used in these processes and added in addition to the polar compound. The sulfur or sulfur compounds further modify the products obtained as more fully shown post.

As these processes may be carried out in various ways, the heating may be effected in open or closed vessels as desired. In the latter case, the air can be entirely or partially displaced by another gas, such as hydrogen, $CO_2$, $SO_2$, $H_2S$, nitrogen, etc., which influence the results obtained, as shown post. Again, in both cases such gases may be passed through the material being treated. That is, the modification can be carried out during the passage of a gas. The gas pressure can be that of atmospheric. In many cases, however, a vacuum may be used with advantage as illustrated post. Again, even a higher pressure of several atmospheres is to be recommended in certain cases, it being sometimes advantageous.

That is, I have further found that the results of the process vary with the nature of the gas present and also with the physical condition (pressure) of this gas. Thus I have found that a certain given starting material which is initially liquid will become viscous only as a result of the electrolyte treatment, if the latter is effected under atmospheric pressure (open vessel) but solid if the gas is rarified by the employment of a partial vacuum. In other cases the converse applies. When plus pressure was used the results differ again. Air gives a different result from another gas or mixtures of gases such as mentioned ante. The electrolyte treatment may be carried out either in the total or partial absence of air, by replacing the same with another gas, such as those shown ante.

That is, the pressure during the electrolyte treatment may be varied to obtain the best results in each particular case. A pressure treatment followed by a vacuum treatment may be used, and I have found it to be advantageous to use alternately, atmospheric or plus pressure and vacuum treatment. Such alternate treatment increases the uniformity of the distribution of the electrolyte in the organic isocolloid. In my processes, the gas may be blown or passed through the liquid mass or simply passed over the surface of the same during the heating. It is advisable in some cases, both when open or closed vessels are employed to have a constant passage of the gas, such as those given ante, during the treatment with electrolyte.

It may be stated with reference to the action of gases, that generally speaking rarification of the gases present, by reduction of pressure in the vessel in which the treatment is given, tends to intensify the action of the gases in my processes, both in the case of solification of the initial material and also in the case of liquefaction thereof.

With regard to the electrolyte treatment used by me, the actual or exact mechanism of the action of the polar compounds or electrolytes is not fully known as yet. But it has been established by me that in my processes anions as well as cations may be used which are similar to the ion series as identified by Hofmeister and Spiro in the coagulation of albuminous brine. (See "Leitfaden der Kolloidschemie," Hans Handowsky, Dresden, 1925, pages 106, 107, 143, 145, 159. Also "Die Grundlagen der Dispersoidschemie," Andor Fodor, Dresden, 1925, pages 43, 182, 231 and 239.)

While the part played by these additions of electrolyte are not fully known at the present, as stated in my Ser. No. 143,786, I have found ion series, namely anions as well as cations, which are useful and effective in modifying organic isocolloids, particularly fatty oils. In the said Ser. No. 143,786, one such ion series is shown as an illustration of the electrolytes which may be used in the practice of my inventions.

In the practice of my invention, I have found that electrolytes or polar compounds containing the following cations or anions or both, are advantageous:

As cations:

Ammonium
Sodium
Potassium
Lithium
Strontium
Calcium
Barium
Magnesium
Iron (ferric and ferrous)
Cobalt
Aluminum
Lead
Antimony
Manganese
Tin (stannic and stannous)
Cadmium
Bismuth
Zinc
Organic ammonium ions, etc., As anions:

Naphthalene sulphonic
Carbonic
Tartaric
Oxalic
Acetic
Formic
Citric
Hydrochloric
Hydrobromic
Hydroiodic
Sulphuric
Sulphurous
Hydrosulphurous
Hydrosulphuric ($-OSO_3H$)
Thiosulphuric
Nitric
Nitrous
Boric
Phosphoric
Hydrocyanic
Hypochlorous
Thiocyanic
Maleic
Salicylic
Phthalic
Benzoic
Sulphanilic
Naphthenic
Trichloracetic
Mono-chloracetic
Naphthalene disulphonic, etc.

Generally speaking, it may be said that cations are more effective than anions and I usually employ metal salts as the electrolyte in my processes for in that way I obtain the effect of both the cation and the anion thereof. However, as stated ante, acids themselves are also useful in the practice of my invention. Both inorganic and organic acids may be used and polybasic acids are advantageous in many cases. Likewise, the acid salts of such acids may be used. As stated ante, acidic polar compounds such as acids, acid salts, etc., are advantageous in modifying fatty oils and other organic isocolloids. Thus both neutral and acid salts may be used in the practice on my invention.

As previously stated, the electrolyte such as salt, acid, etc., should be added in a dry form and advantageously it may be milled into the organic isocolloid or starting material using any of the usual mills, such as funnel-mill, roller-mill, crusher-mill, etc., to obtain the desired dispersion. Other suitable mixers may also be used. These may be heated or further treated as desired.

The temperature and time of treatment in any case depends on the starting material and the results desired. In most cases, the heating is continued for at least one half hour and in many cases for several hours.

Experience has shown that the processes of my invention may be made to effect either a solidification or a liquefaction of the initial material. The results obtained, namely, solidification on the one hand or liquefaction on the other, in a given case depends upon the duration of the heat-treatment of the organic isocolloid material, the quality, quantity and pressure of the gases present and the quantity and quality of the electrolyte employed.

If desired, the electrolyte may be produced in situ, that is, within the organic isocolloid under treatment, by interaction within the organic isocolloid, or of substances capable of reacting under the conditions of the process to produce the electrolyte. The same applies to the gas in the presence of which the organic isocolloid is to be treated and a substance or substances may be added which evolve the desired gas during the processing. It has been found in certain cases that electrolytes and gases which are produced in situ, being in the nascent state, are somewhat more active than those added in the pre-formed state.

Likewise, the organic isocolloid itself may be formed in situ during the treatment. That is, if it is desired to modify an organic isocolloid which is not a naturally occurring material and which has to be produced before it can be treated, the production of such artificial or manufactured organic isocolloid may be advantageously combined with the treatment with the electrolyte. For instance, in making modified heat-bodied fatty oils, the oil may be both heat-bodied and modified in a single step by heat-bodying the fatty oil in the presence of the electrolyte or polar compound. To do this several hours' heating at polymerization temperatures is required. Many of my electrolytes are advantageous for this purpose as they accelerate the heat-bodying and polymerization of fatty oils.

In addition to the action of electrolytes and the cooperating action of gases in effecting the colloidal transformations characteristic of my invention, an additional modification of the ultimate physical properties of the treated products can be effected by the addition to the material under treatment, of purely (i. e., metal-free) organic bodies, such as phenols, naphthols, naphthalene, chloroform, acetone, alcohols and their homologues and derivatives. These additions are supplemental to the use of electrolytes. Some of them are solvents and assist in dispersing the electrolyte in the organic isocolloid. The use of solvents for this purpose is also shown in my Ser. No. 273,159 and other prior applications. Furthermore, siccatives such as used in the varnish industry, may be added in addition to the electrolyte and they reduce the stickiness of the modified products.

According to a further feature of my invention, solid, coherent and elastic products may be obtained, similar in general characteristic to ordinary rubber, by adding sulphur to the initial substance, in addition to the modifying agents mentioned ante. The sulphur may be added as such, or in the form of a sulphur compound, such as sulphur chloride, etc. The action of the sulphur is analogous to that which takes place in the vulcanization of rubber. Thus, accelerators or activators (zinc oxide, etc.) or both, such as usually employed in the vulcanization of rubber, may be used in my processes to accelerate vulcanization when sulphur, etc. is added. The added sulphur vulcanizes or sulphurizes my modified products further changing their properties. I may produce liquid sulphurized products as well as rubber-like solid, by regulating the amount of sulphur and the time and temperature heating.

When the sulphur or sulphur compound is added at the beginning of my processes, sulphurized, modified products are directly produced. So added, the sulphur acts during the gas treatment when such treatment is used in conjunction with the electrolyte.

Also, the sulphur or sulphur compounds may be added to the modified organic isocolloid after the main reaction of my process has been completed. That is, the treatment with sulphur or sulphur compound can be effected if desired in a second stage or subsequent treatment. This is advantageous in many cases, such as in making vulcanized or sulphurized modified oils.

Such two step methods for making vulcanized, modified, heat-bodied fatty oil products are described and claimed in my application Ser. No. 236,800. As there stated, many of those products are useful as "rubber substitutes." Others are useful for other purposes, for instance, in the manufacture of varnishes, lacquers and other liquid coating compositions, as well as in plastic compositions.

Further, various other illustrations of making sulphurized products from organic isocolloids by my methods and of the products obtained are given in my Ser. No. 143,786 and other prior applications.

Generally, in making such sulphurized products, I employ temperatures between 120° and 180° C. and from 5 to 50 parts of sulphur to 100 parts of organic isocolloid, original or modified; the parts being parts by weight. And as accelerators of vulcanization, I may employ hexamethylenetetramine, aniline, diphenyl guanidine (or other guanidine), piperidine pentamethylenedithiocarbamate (or other thiocarbamates), tetramethyl-thiuram disulphide (or other thiuram sulphides), mercaptobenthiazole, heptaldehyde-aniline, etc. as desired. Also antioxidants such as p-amino-phenols, hydroquinone, etc., may be added if desired. Such additions are included in the "purely organic bodies" as mentioned in my Ser. No. 143,786 and shown ante.

I have also found that in my processes the colloidal transformations may be promoted by the use of rays of oscillating energy, such as ultra-violet rays, infra-red rays, X-rays, etc. That is, it is advantageous to irradiate the oil or other organic isocolloid, before or during the treatment with electrolyte. Sometimes a subsequent treatment with these rays is also helpful. Further, these rays influence and intensify the action of the gases in my processes.

My invention is illustrated by the following examples, to which however it is not limited. The parts are parts by weight, unless otherwise stated.

Example 1

To 100 parts of linseed oil are added 5 parts of potassium thiocyanate. The mixture is heated in a vacuum for two hours at a temperature between 300° and 350° C. At the end of this time, the vacuum is broken and the material poured into molds and allowed to cool.

Example 2

To 100 parts of rapeseed oil are added 5 parts of potassium thiocyanate. The mixture is heated in a vacuum for two hours at a temperature between 300° and 350° C. At the end of this time, the vacuum is broken and the material poured into molds and allowed to cool.

In the above examples, 5 parts of cobalt linoleate may be added to the oil in addition to the potassium thiocyanate. Cobalt linoleate is a well known siccative used in the varnish industry. In my processes, cobalt linoleate serves to further modify the oil products so produced. The following examples are illustrative of such embodiments of my invention.

Example 3

100 grams of linseed oil, 5 grams of cobalt linoleate and 5 grams of thiocyanate of potassium are heated in a vacuum for two hours to 300–350° C. the vacuum is then destroyed, the mass poured into molds and left to cool.

Example 4

100 gr. rapeseed oil, 5 gr. cobalt linoleate and 5 gr. thiocyanate of potash are heated in a vacuum for two hours to 300–350° C. the vacuum is then destroyed, the mass poured into moulds and left to cool.

The modified oil product obtained in Example 4 is useful in the varnish industry, that is, it is useful in making varnishes and like compositions. It has increased drying velocity and increased body as compared with the original rapeseed oil.

The modified oil product of Example 2 likewise has improved properties, such as increased body, etc. The same is also true of the modified oil products of Examples 1 and 3. Both of them have increased body (viscosity) as compared with the original linseed oil.

That is, various oils may be used in the practice of my invention and other fatty oils, such as tung oil, castor oil, fish oil (train oils), sunflower oil, olive oil, etc., as disclosed in my Ser. No. 359,425, may be used in the foregoing Examples 1 to 4, in lieu of linseed oil or rapeseed oil.

In fact, oils other than fatty oils may also be modified by these processes. For instance, mineral oils, too, can be advantageously modified by the processes shown in Examples 1 to 4. The following example, using mineral cylinder oil which is a typical mineral oil, is one illustration of the modification of mineral oils.

Example 5

100 gr. mineral cylinder oil, 5 gr. cobalt linoleate and 5 gr. thiocyanate of potash are heated in a vacuum for two hours to 300–350° C. the vacuum is then destroyed, the mass poured into moulds and left to cool.

The modified mineral oil product obtained in Example 5 is a greasy mass having a greatly increased body as compared with the original mineral oil. It is useful as a lubricant.

However, as stated ante (and in my Ser. No. 143,786), the use of the cobalt linoleate or other metal soap, such as linoleates or resinates of metals and metal oxides, in addition to the electrolyte, is optional and the heating and modification may be effected in the absence of such addition of metal soap. The following example shows heating of the mineral oil and electrolyte alone and is another illustration of the modification of mineral oils by my methods.

Example 6

100 grams of mineral cylinder oil and 5 grams of thiocyanate of potassium are heated in a vacuum for two hours to 300°–350° C. The vacuum is then destroyed and a modified mineral oil product is obtained on cooling.

The modified mineral oil product obtained in Example 6 has a viscosity slightly less than that of the original mineral cylinder oil and like the original oil is useful as a lubricant for metals, etc.

That is, in the practice of my invention, I can also reduce the viscosity of oils, as well as increase their viscosity. Naturally the particular result obtained depends in part upon the oil used as a starting material, as well as upon the other factors in my processes. Of course, the particular electrolyte or polar compound used has an important influence in the modification obtained.

And in the foregoing Examples 1 to 6, other salts may be used in lieu of the potassium thiocyanate given in them as illustrative of my use of an electrolyte in modifying oils and other organic isocolloids. Further, as stated ante and in my Ser. No. 143,786, acids may be used in lieu of the metal salts as well as in conjunction with it. Various illustration of such embodiments of my invention are given post.

Example 8

To 100 parts of linseed oil are added 5 parts of sodium oxalate. The mixture is heated in a vacuum for two hours at a temperature between 300° and 350° C. At the end of this time, the vacuum is destroyed and the material poured into moulds and allowed to cool.

The particular method shown in Example 8 above, is specifically claimed in my Ser. No. 143,786.

Example 9

To 100 grams of linseed oil are added 5 parts by weight of cobalt linoleate and 5 parts by weight of sodium oxalate. The mixture is heated in a vacuum for two hours at a temperature of between 250° and 350° C. At the end of this time, the vacuum is broken and the material poured into moulds and allowed to cool.

The material when cooled is semi-solid and of a tacky nature and is eminently suitable for the manufacture of lacquers. It is also quick drying and has good binding properties which render it adaptable for the manufacture of such products as linoleum.

By using rapeseed oil in lieu of linseed oil in Example 9, a similar modified oil product may be obtained. But generally rapeseed oil products are somewhat less viscous than those obtained from linseed oil. However, products having a faster drying rate may be obtained from both of these oils by my methods.

In Examples 8 and 9, in lieu of sodium oxalate, other salts of organic acids may be used, particularly salts of other polybasic acids. In using such salts, the acid salts may be employed with advantage as stated ante. In fact, as also previously stated, the acids themselves may be used. The following example is illustrative of such embodiments of this invention.

*Example 10*

To 100 parts of linseed oil are added 5 parts of salicylic acid and the mixture processed as in Example 1, that is, this mixture is heated in a vacuum for two hours at a temperature between 300° and 350° C. and then the vacuum is broken and the modified oil poured out and allowed to cool. The modified oil so obtained is useful in making varnishes and other coating compositions.

In Example 10, other oils, such as rapeseed oil, castor oil, etc., may be used in lieu of linseed oil to obtain other modified oil products useful in making varnishes and the like. However, in modifying castor oil with this acid, I prefer to employ a lower temperature, say 270° C., and heat for a longer time, as illustrated post. Likewise, in lieu of the salicylic acid, I may employ other acids, such as oxalic, tartaric, citric, etc., disclosed ante, in the practice of Example 10. Also salts of salicylic or other acids may be used in the above example.

Further, as stated ante and in my Ser. No. 143,786, the electrolyte or polar compound may be formed in situ in the oil during the process. The following examples are illustrative of such embodiments of this invention.

*Example 11*

To 100 grams of sunflower oil are added 3 grams of cresol and 3 grams of phosphorous pentoxide and the mixture heated as in the process of Example 9. That is, this mixture is heated in a vacuum for two hours at a temperature of between 250° and 350° C. and then the vacuum is broken and the material poured out and allowed to cool.

Here, a cresol phosphate is formed in situ in the mass during the process, and this salt or polar compound serves as the modifying agent.

The modified oil product so obtained is of a viscous nature and may be used in the manufacture of lacquers, and other coating compositions.

When the temperature is maintained between 250° and 290° C., in Example 11, the modified oil product is a bodied, mobile oil. It is useful for the manufacture of lacquers. It is also adaptable for the manufacture of paints and varnishes and of linoleum products. On the other hand, if the temperature is maintained above 290° C. in Example 11, the cooled product is a semi-solid, heavily bodied oil. This too is useful in making both liquid and plastic compositions useful for coating and other purposes. In either case, during the heating it is advantageous to use a vacuum corresponding to about 50 to 100 mm. mercury pressure.

*Example 12*

To 100 parts of linseed oil are added 2 parts of magnesium peroxide, 2 parts of disodium hydrogen phosphate and 1 part of ammonium chloride and the mixture is heated as in Examples 9 and 11. That is, this mixture is heated in a vacuum for two hours at a temperature between 250° and 350° C. and then the vacuum is destroyed and the material poured out and allowed to cool. During this process, a double phosphate of magnesium and ammonium is formed in situ in the mass. And I have found that this phosphate, acting as it does in a nascent state, is more efficient than a pre-formed phosphate. However, the initially added di-sodium hydrogen phosphate is itself a good modifying agent for fatty oils; the phosphates in general being effective modifying agents for organic isocolloids, particularly oils including mineral oils.

In any event, the modified oil product obtained in the above Example 12 is of viscous nature and may be used in the manufacture of lacquers and other coating compositions. In lieu of the linseed oil, other fatty oils, such as rapeseed, castor, fish, sunflower, etc., may be used in Example 12.

*Example 13*

To 100 parts of linseed oil are added 2 parts of magnesium peroxide, 2 parts of disodium hydrogen phosphate and 1 part of ammonium chloride and the mixture is heated for 5 hours at 300° C. in a vacuum of 100 mm./Hg. Then the vacuum is broken and the modified oil product poured out and cooled.

The modified oil product so obtained is a viscous oil and has an increased drying velocity. It is useful in the preparation of paints.

*Example 14*

To 100 parts of linseed oil in an autoclave, there is added 2 parts of magnesium peroxide, 2 parts of disodium hydrogen phosphate and 1 part of ammonium chloride and the autoclave is closed gas tight. Then the mixture is slowly heated to 300° to 310° C. for three hours under a pressure not exceeding 50 atmospheres, produced by the vapors evolved from the heated material.

The modified oil product so obtained, after cooling, is jelly-like, somewhat tacky product. It is useful in the preparation of paints, enamels and varnishes, as it has increased drying velocity.

Likewise, other fatty oils may be used in Examples 13 and 14, particularly semi-drying oils such as rapeseed oil, etc., and non-drying oils, such as castor oil, etc. for those procedures are not limited to processing drying oil, such as linseed oil, although they are advantageous with drying oils. Further, other metal peroxides may be employed in those examples, in lieu of magnesium peroxide. On the other hand, if a gas treatment with oxygen in situ is not desired, then the metal peroxide may be omitted. The disodium hydrogen phosphate and the ammonium chloride, themselves, are both effective electrolytes in my processes.

In fact, the di-sodium hydrogen phosphate and the ammonium chloride, respectively, are illustrative and representative of two types of salts which may be used alone to modify fatty oils by my methods. The ammonium chloride is representative of the salts of the halogen acids and as shown in my Ser. No. 143,786, various salts of those acids, such as hydrochloride, hydrobromide, hydroiodide, etc., may be employed in modifying oils and other organic isocolloids. Those salts may be used with advantage in modifying all types of fatty oils, including non-drying and semi-drying as well as drying oils such as linseed oil. Such halogen salts are salts of monobasic acids. On the other hand, the said sodium hydrogen phosphate is a salt of a polybasic acid in which only a part of the acid groups have been neutralized with the base(cation). In other words, the second type of salt, ante, is the ones containing one or more free acid groups, the other acid groups being neutralized by the specified cation, which may be ammonium, sodium, potassium, calcium, etc., as shown in my prior applications. For instance, the salts mentioned in my Ser. No. 143,786 which contain the "hydrosulphuric" anion (—OSO₃H) are representative of these acid salts. For example, the sodium salts of "hydrosulphuric acid" is NaOSO₃H and is sodium hydrogen sulphate. It is also known as sodium acid sulphate or sodium bisulphate. As shown in Serial No. 143,786, other acid salts of this type may be used as the electrolyte. Among them are the salts containing this "hydrosulphuric" anion and ammonium, potassium, calcium, etc., as the cation; the ammonium salt being known as acid ammonium sulphate and the calcium salt as calcium bi-sulphate. Acid salts of the other polybasic acids shown in Ser. No. 143,786, may also be used in my processes, particularly those of the organic polybasic acids there mentioned. In fact, as there mentioned, those acids may be themselves employed, alone or mixed with salts. In the latter case, an acid salt is frequently formed in situ during the process. The acid salts being partially neutralized acids, generally they have an effect intermediate between that of the acid, itself and the normal salt thereof. They are so to speak toned down acids and their effect is usually milder than that of the acid per se. And as such, the acid salts are useful in modifying fatty oils and are advantageous in treating non-drying and semi-drying fatty oils, as well as drying oils. For as previously stated, acidic modifying agents generally increase the drying rate of my modified fatty oil products.

The use of the two types of salts described ante, to wit, the salts of halogen acids and the acid salts of polybasic acids, in my processes is illustrated by the following examples.

*Example 15*

To 100 parts of rapeseed oil are added 5 parts of sodium hydrogen sulphate (NaOSO₃H), and the mixture heated as in Example 2. That is, the mixture is heated in a vacuum for two hours to 300–350° C. At the end of this time, the vacuum is broken and the material poured out and allowed to cool.

The modified oil product so obtained is useful in making varnishes and like compositions.

In Example 15, other fatty oils, such as linseed oil, soya bean oil, castor oil, etc., may be used in lieu of the rapeseed oil. Further, a smaller amount of the acid salt (sometimes as little as a fraction of a percent) and heating at lower temperature (but at least 200° C.) may be employed, if a modified oil having only a slight increase in body (viscosity) is desired. For instance, the heating may be at temperatures between 250° and 290° C. as mentioned in Example 11, ante. Also, in lieu of the acid sodium sulphate in Example 15, other acid salts may be used. For instance, another alkali metal hydrogen sulphate, ammonium acid sulphate, calcium bi-sulphate, etc., may be employed. Generally, the ammonium and alkali metal acid sulphates, etc., are useful in the method of Example 15. Likewise, di-sodium hydrogen phosphate and other alkali metal hydrogen phosphates (acid phosphates) may be used here. Further, the organic salts of phosphorus acids (esters) may also be used, as illustrated in Example 11, ante, wherein the phosphoric esters are formed in situ in the oil. And in the general practice of the method of Example 15, I may add such phosphates, the acid salts and esters, in a pre-formed state; that is, directly add them to the oil before heating the mixture rather than form them in situ during the heating. The following examples are illustrative of such embodiments of this invention.

*Example 16*

In this example, a mixture of cresyl phosphates (such as obtained by reacting ordinary cresol with phosphorous pentoxide in a weight ratio of 1:1) is used as the modifying agent.

To 100 parts of sunflower oil are added about 5 parts of said cresyl phosphates. The mixture of oil and phosphates is heated to between 250° and 350° C. in a vacuum for two hours, as shown in Example 11. Then the vacuum is broken and the material poured out and allowed to cool.

The modified oil product so obtained is also of viscous nature and useful in the manufacture of lacquers, varnishes and other compositions. However, its viscosity is less than that of the products obtained in Example 11 under comparative conditions. That is, products having somewhat different specific properties are obtained using the pre-formed esters or salts, as stated in Example 12 ante.

*Example 17*

To 100 parts of linseed oil are added 2 parts of di-sodium hydrogen phosphate. The mixture is heated to between 250° and 350° C. in a vacuum for two hours, as in Example 12. Then the vacuum is broken and the material poured out and allowed to cool.

The modified oil product so obtained is also of viscous nature, but its viscosity is less than that of the modified product obtained in Example 12. However, the modified oil product here, like those obtained in Examples 12 and 13, has increased drying velocity and is useful in making paints, varnishes and other compositions.

In fact, by using the double phosphate of magnesium and ammonium (mentioned in Example 12), in lieu of the di-sodium hydrogen phosphate in Example 17, I also obtain modified oils of the general character set forth in Examples 12, 13 and 14. However, as stated in Example 12, the products obtained using the pre-formed phosphates are slightly different from those obtained with the mixture of materials there described. Likewise, phosphoric acid and other acids, such as salicylic, tartaric, oxalic, naphthalene sulphonic, etc., may be used in lieu of the acid salts, as stated ante.

Further, other fatty oils may be used in Examples 16 and 17, in place of the sunflower oil and linseed oil; for instance, rapeseed oil and the other fatty oils set forth in Example 15.

The following examples illustrate the use of another type of salt disclosed in my Serial No. 143,786, namely, the salts of halogen acids, and the next example shows the use of one such salt of a halogen acid in the method of Example 2 in lieu of the potassium thiocyanate in that example taken from my application Serial No. 143,786.

*Example 18*

To 100 parts of rapeseed oil are added 5 parts of ammonium iodide. The mixture is heated in a vacuum for two hours to 300–350° C. At the end of this time, the vacuum is broken and the material poured out and allowed to cool.

In Example 18, other fatty oils, such as linseed oil, perilla oil, etc. (drying oils), poppyseed oil, soya bean oil, etc. (semi-drying oils) and non-drying oils, such as castor oil, olive oil, etc., may be used in lieu of rapesed oil. Further, fish oil and other mixtures of drying and non-drying fatty oils may be used. In modifying such oils, particularly castor oil, etc., I sometimes prefer to use somewhat lower temperatures, say between 200° and 300° C., and heat for a longer time, as illustrated post. Also, other salts of halogen acids, such as ammonium chloride, ammonium bromide, sodium bromide, zinc bromide, cadmium iodide, etc., may be used in lieu of the ammonium iodide. Further, barium thiocyanate, potassium thiocyanate and other thiocyanates of the metals given ante and in my Serial No. 143,786, may likewise be used. The thiocyanate salts are somewhat similar in action to the halogen salts mentioned ante and may be grouped with them as a sub-generic class of salts. Of course, the results obtained with each of these salts show specific differences in properties. The following examples are further illustrations of such embodiments of my invention.

*Example 19*

To 100 parts of linseed oil are added 5 parts of sodium bromide and the mixture is treated in the manner described in Example 1. That is, the mixture is heated in a vacuum to 300–350° C. for two hours. At the end of this time, the vacuum is broken and the material poured out and allowed to cool. This gives another modified oil.

Other fatty oils may be modified with sodium bromide and other bromide salts, as shown post; for instance, castor oil or other hydroxylated fatty glycerides.

*Example 20*

100 parts of castor oil are heated together with 5 parts of ammonium iodide in vacuo at 260° C. for 5 hours.

A dark-colored soft paste is obtained upon cooling. This modified castor oil product is soluble in acetone. It is useful in making nitrocellulose compositions, such as lacquers, plastics and the like.

By varying the amount of the salt and the temperature and time of heating in Example 20, other modified castor oil products can be obtained. For instance, by heating for a shorter time or at a lower temperature (200–250° C.) or using a smaller amount of the salt, say 2% or less, or combinations of these, modified oils are obtained from castor oil which are oils varying from thinly mobile liquids to thickened (bodied) viscous oils. All such oils have properties different from the original castor oil.

In fact, such modified castor oils may be readily obtained from castor oil by the method of Example 20, using other halogen salts, namely cadmium iodide, zinc bromide, and barium thiocyanate, in lieu of the ammonium iodide. Using those salts in the method of Example 20 to modify the castor oil, I obtain modified oils as follows:

Cadmium iodide; a viscous oil, soluble in acetone;
Zinc bromide; a thick oil, soluble in butyl acetate, as well as soluble in acetone;
Barium thiocyanate; a brown mobile oil, soluble in butyl alcohol and in benzene.

The ammonium iodide and other salts of halogen acids mentioned ante in regard to Example 20, may also be used to modify other fatty oils, such as linseed oil, soya bean oil, etc., as disclosed in my Ser. No. 446,174, to produce other modified fatty oil products also useful in the manufacture of lacquers, varnishes and other coating compositions. Such compositions containing my modified oil products, particularly those made from castor oil, are claimed in my Ser. No. 305,409, filed Nov. 20, 1939, as a continuation of said Ser. No. 446,174 and earlier copending applications set forth ante in this application. In both of those applications, I have disclosed various methods of modifying castor oil and other fatty oils, such as linseed oil, soya bean oil, etc., and the various examples and illustrations given therein illustrate this invention.

In turn, my Ser. No. 446,174, filed April 21, 1930, is a continuation in part of my Ser. No. 359,425, filed April 30, 1929. As stated in my Ser. No. 359,425, it also relates to the same generic invention originally set forth in my Ser. No. 143,786, namely, the modification of organic isocolloids. And as described in my copending application Ser. No. 359,425, further investigation of my generic invention enabled me to discover some special features of particular series of examples of my main invention and to add valuable groups of modifying agents which are active in bringing about the changes described in my Ser. No. 143,786; all of which is fully described in the said application Ser. No. 359,425 wherein I have laid claim to my generic invention.

The complete disclosure of my Ser. No. 359,425, together with that of my Ser. No. 143,786, are to be considered and taken as a part of the present disclosure of this invention, in the present application.

Now, in my Ser. No. 359,425, I have given many examples of the organic isocolloids which may be modified by my methods and of the modifying agents which may be employed by me in doing so in commercial practice. All of them are germain to this invention. For instance, in that application, I have given a list of typical oils which may be advantageously modified by my invention, particularly by the procedures also described therein. As disclosed in said Ser. No. 359,425, I have found that in the following series of oils, to wit, Tung oil
Linseed oil
Castor oil
Fish oil (train oils)
Poppyseed oil
Sunflower oil
Rapeseed oil
Walnut oil
Pine oil
Corn oil
Olive oil the ease of transformation or modification, under equal conditions, decreases in the order given. That is, the first mentioned oils are most rapidly modified by my methods, while the oils at the end of the series are modified more slowly. However, it should be also mentioned that by the employment of suitable modifying agents in my methods, even the last mentioned oils (those at the end of this series) can be profoundly modified and even converted into hard, solid products, as well as those oils appearing in the first of the series.

Further, as described in Ser. No. 359,425, I have observed that those modifying agents, to wit, electrolytes or polar compounds, are most effective which according to Frumfin's method (see Z. physikalische Chemie, 1924, 109, 34–49) impart a negative surface charge to a liquid in which they are dispersed.

Also, as disclosed in Ser. No. 359,425, I have found that the modification of the starting materials (organic isocolloids) may be effected by all compounds comprising within the molecule, an acidic inorganic residue and an organic residue, as well as by the electrolytes (salts, acids, etc.) disclosed in my prior Ser. No. 143,786. By an acidic inorganic residue, I mean such as inorganic residue as can be converted by the addition of one or more hydrogen atoms into an inorganic acid, including carbonic acid as inorganic.

The above mentioned class of polar compounds is a most valuable class of modifying agents in my processes, particularly for modifying fatty oils, resins and like materials ordinarily used in the manufacture of paints, enamels, varnishes, laquers and other liquid and plastic coating compositions.

This broad class of polar compounds includes many advantageous sub-classes such as Organic halogen compounds
Nitro aromatic compounds
Esters of inorganic acids
Inorganic salts of organic bases
Organic sulphonic acids and their halides and esters, Including organic sulphonyl chlorides, etc., as disclosed in said Ser. No. 359,425, wherein many and various specific compounds are given as typical and illustrative of each of the above sub-classes, as well as of the broad class itself.

One advantageous sub-class of these polar compounds are the organic halogen compounds (both aromatic and aliphatic), containing chlorine, bromine, iodine, etc., and the following compounds are typical and illustrative of this class:

o-Dichlorobenzene
p-Dichlorobenzene
Trichlorobenzene
Naphthalene tetrachloride
Naphthalene trichloride
Naphthalene monochloride
Naphthalene hexachloride
Chloral hydrate
Iodoform
Pinene hydrochloride
4-chloro-o-anisidine
p-Nitro-chloro-benzene
Triphenyl chloro methane
Benzyl chloride
Benzoyl chloride
Acetyl chloride
Mono-chloroacetic acid
Trichloroacetic acid.

The halogen compounds listed ante and other halogenated aryl and aliphatic compounds, including acyl chlorides, chloroacids, hydrochloride salts, etc., may be used in the practice of the present invention, particularly in modifying fatty oils. And from the list given ante and as shown in my prior applications, such halogenated compounds may also contain other substituents in addition to the halogen, such as hydroxy, amino, nitro, alkyl, aryl and other groups. Accordingly such polar compounds may also be classified in the other groupings of these modifying agents as shown in my prior applications.

In fact, as stated ante, the nitro compounds per se are useful and advantageous in the practice of the present invention. The following nitro compounds are typical and illustrative of this class:

Nitrobenzene
o-Nitrophenol
p-Nitrophenol
Dinitrobenzene
Nitro-chloro-benzene
Dinitro-chlorobenzene
Dinitroaniline
p-Nitro-acetanilide
Nitrocresol carbonate
m-Nitroaniline hydrochloride
2:4-dinitrobenzene
Nitro-aminobenzene These illustrate the various types of nitro compounds which may be used in modifying fatty oils, resins, etc., in my processes.

Another advantageous sub-class of the polar compounds set forth ante and useful in the present invention, are the organic esters of inorganic acids, both aryl and alkyl esters, and the following are illustrative of this class:

Triphenyl phosphate
Tricresyl phosphate
Nitrocresyl carbonate
Ethyl chlorosulphonate
Dimethyl sulphate In addition to these, other alkyl and aryl esters of phosphoric and other inorganic acid may be also used. Also mixed alkyl and aryl esters, including alkyl-aryl ester, are useful. And when the inorganic acid is a polybasic acid, such as phosphoric, sulphuric, etc., the acid esters thereof, may likewise be used. The acid esters (like the acid salts) as stated ante, are advantageous in modifying fatty oils, particularly oils such as castor oil and the like.

Still another class of polar compounds, set forth in Ser. No. 359,425 and useful in the present invention, are the inorganic salts of organic bases. They are similar to the salts of the inorganic acids, shown in Ser. No. 143,786, but instead of a metal as the cation, they contain an organic radicle as the cation. Further as they contain an organic residue, they may be more readily mixed with oils and other organic isocolloids. The following compounds are illustrative and typical of this class:

Diphenylamine hydrochloride
Diphenylamine hydrobromide
M-nitroaniline hydrochloride
Trichloroaniline hydrochloride
Diphenylamine sulphate
Diaminodiphenyl sulphate
Aniline sulphate
Aniline hydrochloride These salts contain amine radicles and are substituted ammonium salts. Thus they act in somewhat the same manner as the ammonium salts of sulphuric acid and of the halogen acids disclosed in Ser. No. 143,786. That is, they are useful and advantageous in modifying fatty oils. Some of them are of acid character, as they are addition salts carrying the hydrogen of the acid. Further, many of them in addition to being salts, also contain other groups which impart polarity to the compound, such as nitro, amino and halogen groups. Compounds containing such groups are useful per se, as stated ante.

Further, organic salts of organic acids, such as the diphenylamine trichloroacetate and methyl p-toluene sulphonate disclosed in my Ser. No. 359,425. Other wholly organic salts or esters may also be used, particularly the acid salts or esters of organic polybasic acids.

A most advantageous class of modifying agents or polar compounds, disclosed in my Ser. Nos. 143,786 and 359,425 are the aromatic sulphonic acids, which together with their salts, esters and halides, form a most valuable sub-class of polar compounds useful in this invention. Of these, the sulphonic acids and the sulphonyl chlorides are particularly useful here. They are advantageous for modifying fatty oils, particularly linseed oil, rapeseed oil, castor oil, etc., and for resins.

The naphthalene sulphonic acid and the salts thereof disclosed in my Ser. No. 143,786 are typical of this class of polar compounds. Further illustrative compounds, such as disclosed in my Ser. No. 359,425 are as follows:

Benzene sulphonic acid
P-toluene sulphonic acid
2:5 dichlorobenzene sulphonic acid
M-xylidine sulphonic acid
P-toluidine-m-sulphonic acid
Naphthalene 2:6 sulphonic acid
Beta-napthol 1:5 sulphonic acid
Beta-naphthol 3:6:8 sulphonic acid
Beta-naphthylamine 3:6:8 trisulphonic acid
2:1 naphthylamine sulphonic acid
2:6 naphthylamine sulphonic acid
Methyl-p-toluene sulphonate
Ethyl chlorosulphonate
Benzene sulphonyl chloride
P-toluene sulphonyl chloride
Naphthalene-1-sulphonyl chloride Metal salts of such sulphonic acid, such as the sodium and other salts mentioned in Ser. Nos. 143,786 and 359,425, are also useful in this invention. These polar compounds may be represented by the following generic formula $$R-SO_n-Y$$

wherein R represents an aryl nucleus, Y represents hydrogen, chlorine or an alkyl group or a metal and $n$ is 0 to 4. Various examples of the use of such polar compounds in modifying isocolloids by my processes are given in my prior applications, particularly Ser. No. 359,425. The following examples are illustrative of the practice of this phase of my invention.

*Example 21*

This example illustrates the use of a salt of an aromatic sulphonic acid, in lieu of the potassium thiocyanate, in Example 2, ante.

To 100 parts of rapeseed oil are added 5 parts of sodium naphthalene sulphonate. The mixture is heated in a vacuum for two hours to 300–350° C. The modified oil product is recovered as in Example 2.

*Example 22*

This example illustrates the use of the acid, in lieu of the salt thereof, in the procedure of Example 21, as set forth in my Ser. No. 143,786.

To 100 parts of rapeseed oil are added 5 parts of naphthalene sulphonic acid and the mixture is heated in a vacuum for two hours to 300–350° C. The modified oil is recovered as in Example 2.

In Examples 21 and 22, instead of heating the mixture under vacuum, that is, under reduced pressure, the mixture may be heated under increased pressure (above atmospheric pressure) or at atmospheric pressure, as also disclosed in my Ser. No. 143,786. Likewise, as disclosed in that application, other oils, such as linseed oil and other fatty oils, may be used in lieu of rapeseed oil. Again, other acids or the salts thereof may be used as there disclosed. The following examples illustrate such embodiments of my invention wherein other fatty oils and other acids, particularly the other aromatic sulphonic acid shown in my Ser. No. 359,425, are used.

*Example 23*

150 parts of linseed oil are heated in vacuum to 280–310° C. for 5 hours with 7.5 parts of 2:5 dichlorbenzene sulphonic acid.

The modified oil product so obtained is a soft solid product suitable for use in making varnishes.

*Example 24*

150 parts of linseed oil are heated in an open vessel (at atmospheric pressure) with 7.5 parts of 2:5-dichlorbenzene sulphonic acid to 290–310° C. for 5 hours.

The modified oil product so obtained is a viscous liquid. It is somewhat darker in color than that obtained in Example 23, but it is in some respects more suitable for use in making varnishes.

The above Examples 23 and 24 correspond to Examples 3 and 10, respectively of my Ser. No. 359,425. And as disclosed in that application, other aromatic sulphonic acids, including various naphthalene sulphonic acids, benzene sulphonic acid, toluene sulphonic acid, etc., may be used in such methods, as well as the sulphonyl chlorides of such acids. Further, as also disclosed in Ser. No. 359,425, other fatty oils such as castor oil, tung oil, rapeseed oil, fish oils, etc., as well as linseed oil, may be modified in these methods. The following examples are illustrative of such embodiments of my invention.

*Example 25*

100 parts of castor oil are heated with 5 parts of 2:5 dichlorobenzene sulphonic acid in vacuo at 260° C. for 5 hours.

The modified oil product so obtained is a thick viscous oil, soluble in butyl acetate, in acetone and in benzene, as disclosed and described in my Ser. No. 446,174 filed April 21, 1930. Further, as disclosed in that application, other aromatic sulphonic acids, such as benzene sulphonic acid, p-toluene sulphonic acid, etc., may also be used. Likewise, as there stated, various organic sulphonyl chlorides, such as benzene sulphonyl chloride, naphthalene-1-sulphonyl chloride, p-toluene sulphonyl chloride, etc., are also useful.

Further illustration of my methods of modifying castor oil are as follows.

*Example 26*

In this example, a castor oil having an acid number of 9, is used as the starting material.

1000 parts of this castor oil are heated with 30 parts of salicyclic acid at 270° C., for 5 hours in an open kettle.

The modified oil product so obtained is a heavily, bodied oil having an acid number of 11. It can be further treated to reduce its acid number and to increase its body, if desired.

In doing so, the oil is further heated at 200° C., while bubbling nitrogen through the oil, for two hours. The oil product so obtained has an acid number of 7 and is a useful paint and varnish base.

Example 27

1000 parts of the same castor oil (having an acid number of 9) are heated with 2 parts of sulphosalicyclic acid and 20 parts of glycerine, in an autoclave, to 270° C. while slowly bubbling $CO_2$ through the mixture and maintaining a vacuum of 50 mm. Hg. on the outoclave. The mixture is so heated at 270° C. under vacuum for one hour. Then the temperature is reduced to 250° C. and the mixture maintained at that temperature for two hours. Finally the temperature is dropped to 200° C. and the mixture held at this temperature until the modification is completed, about two hours at 200° C. being usually required. During all of these heatings, the introduction of the $CO_2$ gas is so controlled as not to destroy the desired vacuum.

The modified castor oil so obtained has good drying properties and an acid number of 3.2. It is useful in making paints and varnishes.

Example 28

1000 parts of castor oil are heated at 270° C. with 50 parts of p-toluene sulphochloride for one hour and then an additional 9000 parts of castor oil are added to the mixture, and this mixture is then held for 2 hours at 270° C., 2 hours at 250° C. and 1 hour at 200° C., during which time a current of nitrogen is bubbled through the so heated mixture.

The modified castor oil product so obtained has a low to medium viscosity and good drying properties. It is a valuable paint and varnish base.

In Examples 26, 27 and 28, other fatty oils such as those disclosed in my Ser. Nos. 143,786 and 359,425, may also be employed. Likewise, the other acids and acid salts also disclosed in those applications may be employed here.

Further, as disclosed in Ser. No. 359,425, other polar compounds are also useful in my processes here. The following examples are illustrative of such embodiments of my invention.

Example 29

300 parts of linseed oil are heated to 290–310° C. in vacuum with 30 parts of triphenyl chlormethane. The modified product so obtained is a medium viscous oil, suitable for lacquer manufacture.

By using the other halogen organic compounds mentioned ante in this specification, in lieu of the triphenyl chlormethane, still other modified oil products are obtained.

Example 30

300 parts of linseed oil are heated with 15 parts of triphenyl phosphate in vacuum to 280–310° C. for 5 hours.

The modified oil product so obtained is a moderately dark viscous oil, containing the said phosphate dissolved therein.

Example 31

150 parts of linseed oil are heated with 10 parts of diphenylamine hydrobromide in a vacuum to 280–310° C. for 5 hours. The modified oil products so obtained is a moderately dark viscous oil.

Example 32

300 parts of linseed oil are heated with 15 parts of p-nitroacetanilide in a vacuum to 280–310° C. for 5 hours. The modified oil product so obtained is a soft solid, moderately dark in color. It can be advantageously used in preparing varnishes and like coating compositions.

Example 33

150 parts of linseed oil are heated with 7.5 parts of sodium bisulphite under vacuum to 290–310° C. for 5 hours.

In Example 33, other fatty oil may be used in lieu of linseed oil and other acid salts may be employed in lieu of the sodium hydrogen sulphite there used. In fact, as stated ante in this specification, any of the metal salts disclosed in my Ser. Nos. 143,786 and 359,425 are useful in such methods of modifying fatty oils. Other embodiments are shown post.

Example 34

150 parts of linseed oil are heated under vacuum to 290–310° C. for 5 hours with a mixture of 7.5 parts of sodium bisulphite and 3 parts of fuller's earth. The modified oil product so obtained is a moderately soft solid. It is harder than the oil product obtained in Example 33, by heating the oil with the said bisulphite, alone.

In the above example, the fuller's earth is an "auxiliary agent" or "sensitiser" which facilitates the dispersion and distribution of the electrolyte in the oil, as disclosed in my Ser. No. 359,425. It is particularly useful with acidic modifying agents, such as acid salts and acids.

That is, as disclosed in my Ser. No. 359,425, I have further found that the dispersion of the electrolytes or polar compounds (modifying agent) in the starting material is very appreciably facilitated by the addition of certain "auxiliary agents" or "sensitisers." These fall into two groups, namely the purely inorganic, such as silica gel, fuller's earth, etc., and the purely organic, such as formaldehyde, phenol, thiocarbaniline, benzidine, hexamethylenetetramine, 2:3 hydroxynaphthoic acid, a-naphthol, quinoline, pyrogallol, benzene, glycerine and phthalamide, etc. The specific examples of auxiliary agents here mentioned are to be taken as typical of the substances which have been successfully used for this purpose and not as comprising all the effective substances. For instance, in my Ser. No. 143,786, I have also given examples of the "purely organic" additions which may be used in conjunction with the electrolyte, as described ante in this specification.

It should be also mentioned that some electrolytes, quite a number of the new modifying agents (organic polar compounds) disclosed in my Ser. No. 359,425, act as "auxiliary agents" or "sensitisers" when used in conjunction with other modifying agents. For instance, the dissolution of 5% of sodium bisulphite in linseed oil is facilitated and the color of the product is made lighter by the addition of such compounds in amounts of say 2%, of amino-azobenzene sulphate, aniline sulphate, nitrocresyl carbonate, dimethyl sulphate, trichloroacetic acid, benzenesulphonic acid, iodoform, naphthalene tetrachloride, pinene hydrochloride, m-xylidine-sulphonic acid, B-naphthylamine-6:8-disulphonic acid, acetyl chloride, p-nitroacetanilide, chloral hydrate, triphenyl phosphate, naphthalene 1 sulphochloride, oxalic acid, diphenylamine hydrobromide, amino salicylic acid, pale cresylic acid, 2:6 naphthalene disulpho acid, o-dichlorbenzene, etc.

Further, as stated in Ser. No. 359,425, the advantages of a rapid dissolution of the modifying agent are greatest in those cases where a clear, pale or colorless product is desired, especially for examples, for the varnish industry. They are also important in the manufacture of oil products for the rubber industry, and are very manifest in the case of fatty oils to be heated with metal organic salts, carbonates, sulphides, sulphites, hydrosulphites, thiosulphates, or halides, as set forth ante.

And as also stated in my Ser. No. 359,425, products from fatty oils suitable for the manufacture of lacquers and varnishes are obtained by my processes, particularly tung oil, linseed oil, castor oil, sunflower oil, fish oils, and the like, as disclosed in that application and further illustrated ante.

However, my invention is not limited to modifying fatty oils, but is broadly applicable to modifying all organic isocolloids, including resins, etc., as stated in my application Ser. No. 143,786. And as disclosed in that application and also in my Ser. No. 359,425, resins may also be modified by the processes and modifying agents set forth ante.

As disclosed in said Ser. No. 359,425, resins by liquefaction gives substitutes for drying oils for use in oil lacquers (varnishes, etc.), since the liquefied resins have excellent drying properties.

As stated in Ser. No. 359,425, I find that the ease of modification varies with the natural origin of the resin; these resins being natural resins or gum, such as rosin, etc. As further disclosed in that application, I have found that of these resins, those of American, French and Spanish origin are more easily liquefied than the Greek resins, though the latter undergo considerable improvement and become suitable for lacquer manufacture. The following modifying agents, amongst others, are eminently suitable and useful in the liquefacation of resins:

Ammonium iodide
Magnesium sulphate
Magnesium chloride
Barium thiocyanate
Zinc carbonate
Zinc bromide
Sodium sulphide
Lead chromate
Potassium dichromate
Barium sulphide
Cadmium sulphide The liquefaction is preferably carried out by heat treatment of the resin and modifying agent in vacuo. Usually the temperature employed is between 250° and 300° C. and temperatures of 270° to 290° are advantageous. The time required depends on the particular material used and on the liquefaction desired. Generally from 2 to 12 hours heating will produce any desired liquefaction with most resins. Thus the conditions for modifying resins are generally similar to those used ante for modifying fatty oils. Likewise in modifying resins, I may also employ the "auxiliary agents" mentioned ante. For instance, as disclosed in Ser. No. 359,425, addition of 5% of formic acid to the mixture of resin and metal salt increases the velocity of dissolution of those modifying agents with consequent improvement of the resulting product. By such methods I convert the natural resins which are hard and brittle, into modified resins which are non-brittle and have a lower fusion or melting point varying with the extent of the liquefaction. Generally these liquefied resins are plastic, soft resins. In some cases, they are viscous liquid gels, that is, heavy viscous liquids similar to very heavily bodied linseed oil. Thus, as stated in my Ser. No. 143,786, soft to liquid resins of any intermediate viscosity or hardness can be obtained from solid resins by my processes.

The following examples illustrate the liquefaction of resins by my methods.

Example 35

300 parts of resin are heated with 30 parts of zinc carbonate and 5 parts of formic acid under a vacuum of 25-30 inches of mercury for 10-12 hours at 270-280° C.

The product so obtained is a very viscous oil which can be used in the varnish industry as a substitute for a drying oil, especially suitable for the manufacture of water-fast varnishes.

The addition of the formic acid serves to accelerate somewhat the dissolution of the modifying agent, as stated ante. Its use being optional as shown ante, the resin may be modified with the zinc carbonate alone, if desired. This is shown in the next example.

Example 36

100 parts of rosin and 5 parts of zinc carbonate are heated to between 280° and 290° C. in a 25-29 inch vacuum for 3 to 5 hours.

The modified resin so obtained is a plastic, soft resin having a so-called cold flow. It is useful in making varnishes and like compositions. Varnishes containing as part of the film-forming constituents have increased drying velocity and yield films having increased gloss. It is also useful in making printing inks. Further, it is useful in making lacquers, nitrocellulose and other cellulose ester compositions.

Example 37

To 100 parts of hard American rosin are added 8 parts of magnesium sulphate and 4 parts of formic acid and the mixture heated in a partial vacuum for a few hours, until upon cooling a viscous fluid modified resin is obtained. In lieu of magnesium sulphate, ammonium iodide may be used.

In the above examples, the other salts mentioned ante as suitable for the liquefaction of resins may be used in lieu of those specified in Examples 36, 35 and 37 to obtain still other modified resins from natural resins such as gum rosin, wood rosin, copals, etc., by my methods. Also, by these methods, I can modify synthetic resins containing said natural resins, such as ester gums, rosin modified phenolic or alkyd resins, etc.; the ester gums and alkyd resins being esters of polyhydric alcohols with organic acids including fatty acids or resin acid or both, and being generally glyceride esters, they are organic isocolloids of a type somewhat analogous to the fatty oils particularly heavily bodied fatty oils.

Likewise, in Examples 35, 36 and 37, and in similar embodiments of such methods, the amount of modifying agent (metal salt, etc.) may be varied, as disclosed in my prior Ser. No. 359,425, for instance, varied from say 2 to 10% on the resin material being modified. In all cases, modified resins useful in making varnishes are obtained.

Thus as shown ante, I can produce modified products useful in making varnishes and lacquers from fatty oils or resins or both; and some times I use a mixture of fatty oil and resin (rosin, etc.) as the starting material and simultaneously modify both the fatty oil and resin by my methods.

Further, as disclosed in my prior and copending application Ser. No. 359,425, I obtain modified products suitable for making improved water-fast varnishes and lacquers and like compositions, by a suitable choice of modifying agents. And as stated in that prior application, for this purpose, I choose modifying agents which are substantially insoluble in water. And as further disclosed in my said Ser. No. 359,425, I find that agents of this type, such as > Tin carbonate
> Tin sulphite
> Tin sulphide
> Antimony sulphide
> Zinc sulphide
> Barium sulphide
> Barium carbonate
> Calcium sulphite
> Strontium sulphite
> Magnesium sulphite
> Barium sulphite
> Lead sulphite
> Cadmium sulphite
> Cadmium sulphide
> Mercuric sulphate and the like, are advantageous in my processes for modifying fatty oils, resins and other organic isocolloids. However, some of these salts are very difficultly soluble in the starting materials to be modified, for instance, fatty oils. And in such cases, it is advantageous to produce the modifying agent in situ. Thus barium sulphate is very insoluble in linseed oil, whilst magnesium sulphate and barium peroxide are more easily soluble, and I therefore, dissolve these two substances, namely the magnesium sulphate and barium peroxide, in the linseed oil and produce within the oil the insoluble modifying agent, barium sulphate. By using zinc carbonate and barium peroxide in this way, I produce in the oil barium carbonate and zinc oxide, both insoluble in water, and the product subsequently obtained gives an excellent, water-fast varnish. Likewise, I have found it advantageous to use both a metal salt and a metal peroxide in modifying resins, as well as fatty oils, as further disclosed in said prior application Ser. No. 359,425 and other prior applications.

As disclosed in my Ser. No. 359,425, resins give good lacquer bases by solidification; the resin being converted into a hardened resin by the method disclosed by me therein. And this solidification of resins, as further disclosed in said Ser. No. 359,425, is readily obtained when the resin is heated with minor amounts of both a metal salt, such as lithium sulphite, and of a metal peroxide, such as zinc peroxide, say 5% of each on the resin; the heating being continued until a hardened resin is obtained upon cooling.

That is, as disclosed in Ser. No. 359,425, I have further found that the use of oxygen-generating substances, such as peroxides and especially peroxides of metals giving water-insoluble compounds when combined with the anion of the modifying agent used, is particularly suitable for the production of varnish bases by my invention from fatty oils, resins and other organic isocolloids. The oxygen which results from this procedure seems to have special value for this purpose. The following examples amongst others illustrate this feature:

Zinc carbonate in conjunction with one of the following: bismuth peroxide, manganese peroxide, nickel peroxide, zinc peroxide, strontium peroxide, cerium peroxide. Also, mercuric carbonate with barium peroxide or magnesium peroxide. And, lead carbonate with barium peroxide. The following examples illustrate the use of metal peroxides with metal salts in modifying fatty oils, resins and other organic isocolloids by this invention.

*Example 38*

300 parts of linseed oil are heated under vacuum to 270–300° C. for 5 hours with a mixture of 7.5 parts of zinc carbonate and 7.5 parts of barium peroxide.

The modified oil product so obtained is a moderately soft solid, especially suitable for use in the preparation of water resisting varnishes.

*Example 39*

100 parts of rosin, 5 parts of zinc carbonate and 5 parts barium peroxide are heated in an open kettle to 280°–300° C. for one hour.

The modified resin so obtained, upon cooling, is a light colored, hard resin having greatly increased melting point. It yields fast drying varnishes giving hard tough films. The above Examples 38 and 39, respectively, show the modification of the fatty oil and of the resin, separately, with the metal salt and metal peroxide. Also, the rosin (or other resin) and the fatty oil may be mixed together and the mixture heated with the zinc carbonate and barium peroxide, to simultaneously modify each of them in the presence of the other; both being modified by the treatment. In this way, a varnish base containing both the modified oil and resin, can be directly obtained. And this is advantageous in making varnishes and other compositions having improved drying properties and improved resistance to water. Likewise, ester gum and other resinous synthetic esters containing acids of resins or of fatty oils or both, may be so modified by the methods illustrated in these examples. Further, "rosin-modified" phenolic (phenol-aldehyde) resins can also be modified by my methods ante to improve their properties in the same way.

While the use of metal peroxides in conjunction with the metal salts or electrolyte is advantageous, it is not essential to the broader practice of my methods. For, as shown ante, the metal salts or other electrolytes (polar compounds) may be used alone to modify fatty oils, resins and other organic isocolloids. And even the water insoluble salts may be directly added to the fatty oil or resin instead of being formed in situ, to obtain modified products resistant to water.

In any event, as is apparent from the disclosure ante, my invention is not limited to the use of metal peroxides and as stated in my Ser. No. 359,425, my invention is not limited to the production of solid varnish bases from liquid fatty oils.

As shown ante and disclosed in my prior applications, I also convert solid resins into liquid modified products which likewise are useful in making varnishes. And for this purpose, I may advantageously use magnesium sulphate, sodium sulphide, ammonium iodide, magnesium carbonate, zinc carbonate and lead chromate, as all of them give excellent varnish materials from resins. However, the last three salts and other water-insoluble modifying agents or polar compounds are superior in that the products made with their help may be employed for water-fast varnishes. Naturally, other constituents present in the varnish also influence its fastness to water. Likewise, as shown ante, I also obtain liquid modified products from fatty oils which like the liquefied resins are also useful in making varnishes and have increased drying velocity. Such liquid modified products (either from fatty oils or resins or mixtures of these) range in viscosity from thin mobile oils to heavy viscous liquids having so-called "cold" flow; the latter being viscous liquid gels containing a high concentration of dispersed phase in the organic isocolloid.

As my liquid modified oils have increased drying properties or drying power, they like the ordinary drying oils, such as linseed oil, can be heat-bodied or polymerized in the usual way, that is by heating to the usual polymerizing (heat-bodying) temperatures, say about 550°–600° F. commonly used in heat-bodying linseed oil. When this is done in the presence of my modifying agents (electrolytes or polar compounds) the polymerization or heat-bodying is accelerated in most cases. Thus in some embodiments of my invention, the oil and polar compound are heated at heat-bodying or polymerizing temperatures to modify the oil with the aid of the added polar compound and then the heating continued in the presence of the polar compound until a modified, heat-bodied oil product is obtained. In such embodiments of my invention, metal salts are advantageous as the electrolyte or polar compound used as the modifying agent. In this way, I can obtain, if desired, modified oil products which are solid or semi-solid at room temperature and which are a new type of heat-bodied oil product. However, this is but a minor part of the generic invention set forth in my prior applications.

The present invention is primarily directed to the production of modified products having increased drying velocity and useful in making varnishes and like coating compositions, from fatty oils, resins and combinations of such materials. Therefore, I refer to those from resins as "resin products" and those from fatty oils as "oil products."

By the vulcanization of my oil products and resin products, I obtain substances which yield new types of lacquers and varnishes. Various combinations of vulcanized and unvulcanized oil and resin products may be used. For instance, a resin product may be vulcanized and used with an unvulcanized oil product or vice versa. Again a mixture of an oil product and a resin product may be vulcanized together or a solution of such a mixture in a suitable solvent may be treated with a vulcanizing agent.

For vulcanizing my oil or resin products, I may use hot vulcanization with sulphur as described ante in this specification and disclosed in my other applications. Again, I may vulcanize them in the cold with sulphur chloride as the vulcanizing agent; for instance as described in my Ser. No. 359,425. In hot vulcanization with sulphur, I may use the accelerators and activators of vulcanization described ante. Likewise, I may also incorporate antioxidants in my vulcanized products, either before or after vulcanization, such as p-aminophenol, hydroquinine, and other known anti-oxidants. Such additions are included in my Ser. No. 143,786 as "purely organic bodies" and in my Ser. No. 359,425 as "auxiliary agents."

The vulcanized products obtained from my oil products or resin products or mixtures of these, are valuable for varnishes and lacquers, giving films which are very elastic, fast to weathering and suitable for stoving. After stoving they exhibit a high degree of resilience and hardness. The character of these varnishes and lacquers may be varied by varying the temperature of vulcanization, the proportion of sulphur, the nature and quantity of accelerator and activator, and further by the addition of a filler. For instance, when gas black is added as a filler, the ageing properties of the varnish films are improved accordingly. Other fillers and pigments may be added as desired.

For purposes of the present invention, namely the production of modified fatty oils having increased drying velocity and other improved properties, suitable for making varnishes, etc., I classify the fatty oils as follows:

Drying oils: Tung oil, oiticia oil, linseed oil, perilla oil, etc.
Semi-drying oils: Sunflower oil, poppy seed oil, soya bean oil, walnut oil, etc.
Non-drying oils: Rapeseed oil, olive oil, corn oil, cotton seed oil, coconut oil, etc.
Special oils:
    *a.* Hydroxylated; castor oils, etc.
    *b.* Fish oils (train oils).
The fish oils are mixtures of non-drying and drying triglycerides.

And in the practice of my invention, I may mix together fatty oils of the various classes ante, before modifying them, if desired. This is sometimes advantageous, for in this way, composite, improved, modified products are directly obtained by my methods.

On the other hand, two or more of my modified oil products may be mixed together in making paints, varnishes, enamels, etc., if desired. Further, in making varnishes and other compositions, as disclosed in my Ser. No. 446,172, both my modified oil products and my modified resin products may be incorporated in various natural fatty oils as there described.

The Ser. No. 446,172 describes the use of greatly modified isocolloids as modifying agents. I have found that in many cases, e. g., when a fast drying oil is to be made from castor oil, light colored products may be obtained by using this method. The following examples illustrate this part of my invention:

*Example 40*

A concentrated dispersion of sulfuric acid in castor oil is being prepared, by mixing together 10 parts by weight of concentrated sulfuric acid and 90 parts by weight of castor oil. This mix is stored cold /at room temperature/ a few hours, e. g., overnight. 1000 parts by weight of castor oil and 20 parts by weight of the so prepared 10% strong dispersion of sulfuric acid in castor oil is mixed and heated in a similar manner as described in Example 27. After the heat treatment is finished 10 parts by weight of glycerine are added and the mix heated for two hours at 200° C. in an open kettle or in an autoclave at normal atmospheric pressure. A low acid number may be obtained according to this process and the resulting oil has good drying qualities, without being increased in viscosity to a great extent.

The longer storing of the concentrated dispersion of the modifying agent and the oil is not essential for the effectiveness of the above example.

As stated ante dissolution promoting or dispersion promoting auxiliary agents improve also the color of the product obtained. Typical examples of the inorganic auxiliary agents of this kind in my processes are earthy compounds, such as fuller's earth, silica gel, mica, infusorial earth, diatomaceous earth, clays, kaolin and other silicates. The application of these may be illustrated in the following example:

*Example 41*

A concentrated sulfuric acid dispersion is prepared by mixing 10 parts by weight of concentrated sulfuric acid and 90 parts by weight of fuller's earth. 1000 parts of castor oil and 20 parts of this sulfuric acid—fuller's earth mix is heated in the same manner as described in Example 40. The resulting product is a light colored fast drying oil, useful in the preparation of paints, varnishes, enamels, lacquers and other protective coating compositions.

Another modification of my process, to obtain light colored fatty oil products, is to use an electrical field to accelerate the action of the acidic polar compounds. The following example illustrates this process:

*Example 42*

300 parts of linseed oil are heated with 15 parts of sodium bisulfite (all parts by weight) in an open vessel, fitted with a stirrer, and two metal electrodes. A potential difference of 200 to 250 volts is maintained between the electrodes, which reach into the reaction mixture and the temperature is raised to 290 to 310° C. After 3 hours of heating the resulting product is thicker than that obtained by heat treatment of linseed oil under similar conditions in the absence of an electric field.

If the experiment is carried out in a closed vessel under a vacuum of 25 to 30 inches of mercury at 250° to 300° C., a similar result is obtained. Thickening of the oil occurs more readily in the presence of an electric field. In the above parts by weight are grams and the electric current used is 230 volts, D. C., the electrodes may be placed half an inch apart. The voltage and the distance of the electrodes may be varied as well, as different types of alternating current may also be used. This example is similar to Example 7 of Ser. No. 359,425.

In the above specification the increased drying velocity of oils, e. g., if treated according to the disclosed processes with acidic polar compounds, means always a comparison with an oil, treated in the absence of such polar compounds, otherwise under similar conditions. The oils, when heated to polymerizing temperatures, change their body, viscosity and to lesser degree also their drying velocity. The action of the acidic polar compounds may be observed if we compare the resulting product to an oil, treated under similar conditions, heated to the same temperature and for the same time, but in the absence of acidic polar compounds. The increased rate of drying causes usually also an increased rate of bodying of the oils, all other conditions being equal.

The acidic polar compounds useful in the practice this invention are not limited to only inorganic or organic acids or acid salts of such acids, although those types of acidic polar compounds are advantageous. I may also use the organic polar compounds containing within the molecule an acidic inorganic residue and an organic residue, as described ante and in my prior applications. Many of them give modified products similar to those obtained with inorganic and organic acids or acid salts thereof. For instance p-toluene sulphonyl chloride, benzene sulphonyl chloride, and other aromatic sulphonyl chlorides are useful. Again chloral hydrate, iodoform, nitrophenols, etc. may be useful also. Further salts of organic bases with inorganic or organic acids are likewise useful as shown ante. E. g. the amine salts of inorganic acids, such as the halogen acids. Likewise metal salts of the halogen acids are also advantageous, as shown ante. All of these is fully described and shown in my prior applications, of which the present application is a continuation in part.

In general compounds which form an acidic polar compound in situ by the action of heat, water or hydrogen, etc. are useful. During my processes complex changes usually occur, in the presence of acidic polar compounds as a result of which new, improved modified products are obtained from fatty oils, resins and the other isocolloids as described ante as useful starting materials in my processes. For instance if oils, resins and other compounds containing high molecular acids or derivatives of such acids are heated to temperatures above 200° C. water and hydrogen may be given off by the starting material, accompanied by complicated changes in those starting materials, such as condensation, polymerization, shifting of double bonds, dehydroxylation, decarboxylation, amongst others. In any event in my processes such changes as result in increasing the drying velocity and effecting other improvements in the properties of the starting materials are accelerated by the presence and action of my aforesaid polar compounds; at least beneficial and desirable results are obtained, although it is impossible to ascertain the exact mechanism by which they are obtained in each particular commercial embodiment of my present invention.

Having described my invention and various illustrative embodiments thereof, what I claim is:

1. In the manufacture of improved, modified products, suitable for making varnishes, lacquers and like coating compositions, from fatty oils and materials containing the same, said modified products having increased drying velocity and other improved properties, the step which comprises heating said materials in the presence of a minor amount of an acidic polar compound at a temperature of at least 250° C. and for a time sufficient to modify the physical properties of and increase the drying velocity of said materials, said heating being continued for at least 30 minutes and the amount of said acidic polar compound being sufficient to substantially modify the said properties of said material.

2. The process of claim 1, wherein said material is a fatty oil.

3. The process of claim 1, wherein said material is a non-drying fatty oil.

4. The process of claim 1, wherein said material is a semi-drying fatty oil.

5. The process of claim 1, wherein said material is a drying fatty oil.

6. The process of claim 1, wherein said material is castor oil.

7. The process of claim 1, wherein said material is rape seed oil.

8. The process of claim 1, wherein said material is linseed oil.

9. The process of claim 1, in which said polar compound is an acid salt.

10. The process of claim 1, in which said polar compound is an acid salt of a polybasic acid.

11. The process of claim 1, in which said polar compound is an acid alkali metal salt.

12. The process of claim 1, in which said polar compound is sodium hydrogen sulphate.

13. The process of claim 1, in which said polar compound is sodium hydrogen phosphate.

14. The process of claim 1, wherein said material is castor oil and said polar compound is sodium hydrogen sulphate.

15. The process of claim 1, wherein said material is linseed oil and said polar compound is sodium hydrogen sulphate.

LÁSZLÓ AUER.

CERTIFICATE OF CORRECTION.

Patent No. 2,298,270. October 13, 1942.

LÁSZLÓ AUER.

It is hereby certified that error appears in the printed specification of the above numbered patent requiring correction as follows: Page 1, first column, lines 35 and 36, for "1938; and Ser. No. 305,409, filed November 20, 1939, now Patent 2,234,545" read --1938, now Patent 2,234,545; and Ser. No. 305,409, filed November 20, 1939--; page 11, first column, lines 22 and 37, for "P-toluene" read --p-toluene--; line 24, for "M-xylidine" read --m-xylidine--; line 25, for "P-toluidine" read --p-toluidine--; page 12, first column, line 7, for "outoclave" read --autoclave--; page 13, first column, line 22, for "gives" read --give--; line 36, for "liquefacation" read --liquefaction--; and that the said Letters Patent should be read with this correction therein that the same may conform to the record of the case in the Patent Office.

Signed and sealed this 12th day of January, A. D. 1943.

(Seal)

Henry Van Arsdale,
Acting Commissioner of Patents.